Hefner, Jr.

United States Patent [19]

[11] 4,426,496
[45] Jan. 17, 1984

[54] POLY(ALLYL)POLY(ALKENYLPHENOL) POLYMER COMPOSITIONS

[75] Inventor: Robert E. Hefner, Jr., Lake Jackson, Tex.

[73] Assignee: The Dow Chemical Company, Midland, Mich.

[21] Appl. No.: 437,249

[22] Filed: Oct. 28, 1982

[51] Int. Cl.$^3$ .................... C08L 67/00; C08L 67/08; C08L 77/12

[52] U.S. Cl. .................... 525/168; 525/178; 525/112; 525/118; 525/169; 525/170

[58] Field of Search ............ 525/165, 168, 178, 502, 525/518, 531, 112, 118, 169, 170

[56] References Cited

U.S. PATENT DOCUMENTS

| | | | |
|---|---|---|---|
| 3,721,641 | 3/1973 | Whitt | 525/118 |
| 3,959,062 | 5/1976 | Koh et al. | 525/165 |
| 4,018,725 | 4/1977 | Hadley | 525/582 |
| 4,173,592 | 11/1979 | Suzuki et al. | 525/134 |
| 4,217,433 | 8/1980 | Dyball | 525/277 |
| 4,221,700 | 9/1980 | Minagawa et al. | 525/165 |

FOREIGN PATENT DOCUMENTS

| | | | |
|---|---|---|---|
| 2818091 | 11/1978 | Fed. Rep. of Germany | 528/152 |
| 51-25543 | 3/1976 | Japan | 526/313 |

OTHER PUBLICATIONS

Chem. Abstracts, vol. 97, 1982, Entry 3/277c.

Primary Examiner—Joseph L. Schofer
Assistant Examiner—Peter F. Kulkosky
Attorney, Agent, or Firm—J. G. Carter

[57] ABSTRACT

Thermosettable resin compositions are disclosed which comprise a mixture of (1) an unsaturated polymerizable monomer, (2) an unsaturated polymerizable resin selected from (a) unsaturated polyester or polyesteramide resins, (b) vinyl ester resins and (c) dicyclopentadiene modified unsaturated polyester of polyesteramide resins and (3) a poly(allyl)poly(alkenylphenol).

30 Claims, No Drawings

POLY(ALLYL)POLY(ALKENYLPHENOL) POLYMER COMPOSITIONS

BACKGROUND OF THE INVENTION

The present invention pertains to novel thermosettable compositions.

Thermosettable compositions such as unsaturated polyester resins, dicyclopentadiene modified unsaturated polyester resins, unsaturated polyesteramide resins, dicyclopentadiene modified unsaturated polyesteramide resins, vinyl ester resins and the like are well known. Such resins can be employed as is, but are usually diluted with a polymerizable unsaturated monomer such as styrene. These resins are useful in the preparation of castings, laminates, coatings, and the like. However, such resins create relatively large exotherms upon curing, usually with peroxide curing agents, which can induce cracking or fracturing of the cured part, as well as excessive volatile monomer loss.

The present invention provides a thermosettable resin composition which has reduced exotherm temperatures without an unacceptable low in reactivity rate and in many instances, the cured resin has an improvement in one or more properties such as heat distortion temperature, hardness, tensile strength, elongation, resistance to thermal aging and the like.

SUMMARY OF THE INVENTION

The present invention concerns a composition which is thermosettable upon curing with a curing quantity of a suitable curing agent, which thermosettable composition comprises, (1) from 5 to about 95, preferably from about 20 to about 80, most preferably from about 45 to about 70, percent by weight (pbw) of at least one resin composition selected from the group consisting of
 (a) unsaturated polyester resins,
 (b) unsaturated polyesteramide resins,
 (c) dicyclopentadiene modified unsaturated polyester resins,
 (d) dicyclopentadiene modified unsaturated polyesteramide resins, and
 (e) vinyl ester resins, (2) from zero to about 95, preferably from about 70 to about 20, most preferably from about 30 to about 55, pbw of at least one polymerizable ethylenically unsaturated monomer; and (3) from about 1 to about 50, preferably from about 1 to about 30, most preferably from about 3 to about 15 pbw of a composition represented by the formulas

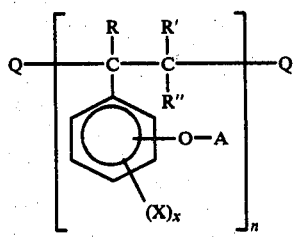

I.

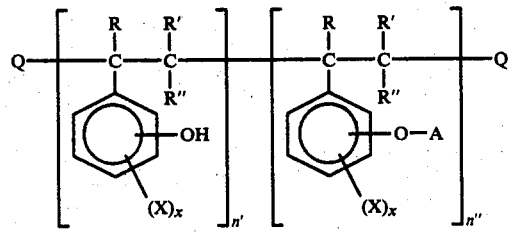

II.

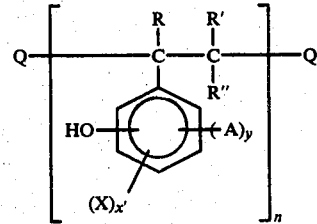

III.

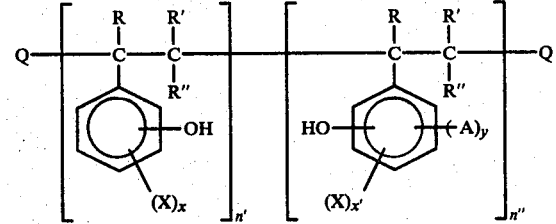

IV.

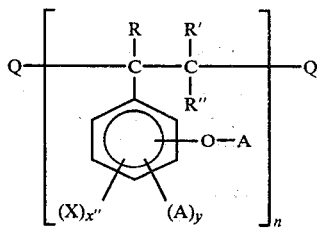

V.

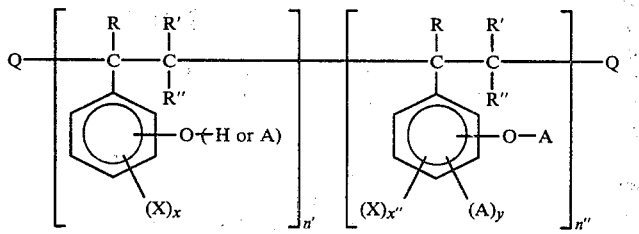

VI.

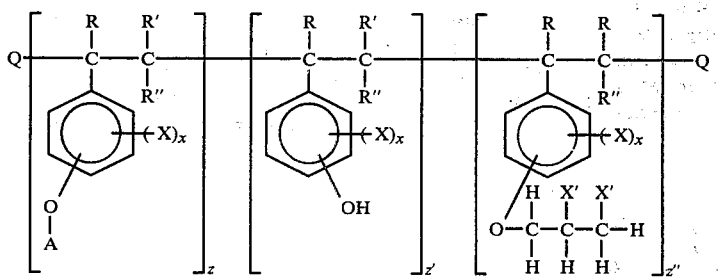

VII.

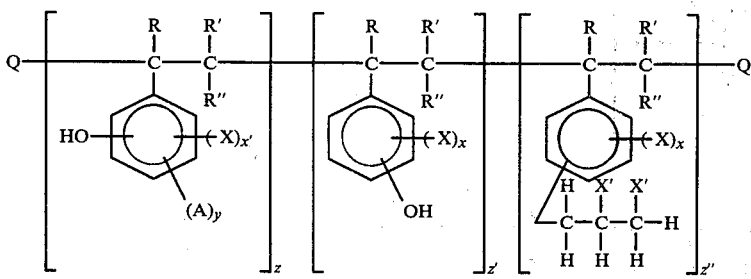

VIII.

wherein each A is a group represented by the formula —CH$_2$—CH=CH$_2$ (allyl); each R, R' and R" is independently hydrogen or an alkyl group having from 1 to about 3 carbon atoms; each X is independently an alkyl group having from 1 to about 4 carbon atoms, chlorine or bromine; each X' is independently chlorine or bromine; Q is independently a group derived from any suitable polymerization initiator or terminator, —H,

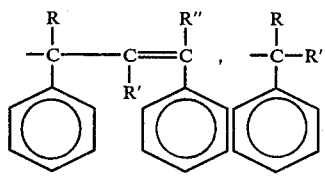

and wherein each aromatic ring may contain any substituent group as those enumerated as substituent groups in Formulas I through VIII; n has a value from about 5 to about 100, preferably from about 15 to about 80; n' has a value of from about 1 to about 99, preferably from about 1 to about 30; n" has a value of from about 1 to about 99, preferably from about 30 to about 99; x has a value from zero to 4; x' has a value of from zero to 3; x" has a value of zero to 2; y has a value of 1 or 2; z has a value from 0 to about 100; z' has a value of from 0 to about 100 and z" has a value from about 1 to about 100 and wherein the pbw of the individual components is based upon total composition.

DETAILED DESCRIPTION OF THE INVENTION

The polymers employed herein which are represented by formulas I and II wherein A is allyl can be prepared by the transcarbonation process wherein allylmethyl carbonate or a crude mixture containing allylmethyl carbonate is reacted with the poly(alkenylphenol) in the presence of a catalytic amount of palladium on carbon and triphenylphosphine. Although less preferred, the polymers of Formula II wherein A is allyl can be prepared by the direct allylation of a poly(alkenylphenol) with an allyl halide such as allyl chloride in the presence of an alkaline agent such as an aqueous solution of alkali metal hydroxide. Reaction temperatures of from about 25° to about 150° C. are operable with temperatures of 50° to 100° C. being preferred. If desired, inert solvents such as 1,4-dioxane and phase transfer catalysts such as benzyltrialkylammonium halides or tetraalkylammonium halides can be employed.

The average molecular weights of allylated derivatives of the poly(alkenylphenols) vary as a function of the average molecular weight of the respective poly(alkenylphenol) precursor as well as the extent of allylation. The extent of allylation may be varied such that each phenolic nucleus within the polymer chains is converted to an allylether group (Formula I wherein A is an allyl group) or only a portion of said phenolic hydroxyl groups are converted to allylether groups (Formula II wherein A is an allyl group).

The polymers represented by Formulas III and IV wherein A is an allyl group can be prepared by a thermally induced Claisen rearrangement of the polymers of Formulas I and II, respectively, wherein about all of the allylether groups are rearranged to form a hydroxyl group with one allyl group attached to the ring in an ortho position relative to the hydroxyl group. The reaction time or reaction temperature of the Claisen rearrangement can be decreased together or independently to convert only a part of the allylether groups of the polymers represented by Formulas I and II to allyl groups on the aromatic rings. Reaction time in excess of that required to induce rearrangement can cause partial homopolymerization of the allyl groups especially in polymers of the type represented by Formula I with average molecular weights over about 1000. The term partial homopolymers as used herein means that not all of the allyl groups have been polymerized.

The polymers represented by Formulas V and VI wherein A is an allyl group can be prepared by allylation, preferably via the transcarbonation process, of the polymers of Formulas III and IV, respectively. If so desired, only a part of the aromatic hydroxyl groups of the polymers represented by Formulas III and IV can be converted to allylether groups by using less than stoichiometric amounts of allylmethyl carbonate. The polymers represented by Formulas V and VI are complex isomeric mixtures of polyallylpoly(alkenylphenols).

The polymers represented by Formulas VII and VIII can be prepared by halogenation of the polymers of Formula I or II and Formula III or IV, respectively. The halogenation is carried out in a solvent suitable for the allylated poly(alkenylphenol) of Formulas I, II, III, or IV. One useful solvent is methylene chloride. The solution is maintained at minus 20° C. to 50° C. and preferably 0° to 25° C. The solution is sparged with nitrogen, the halogen, preferably bromine, is added dropwise with stirring while maintaining reaction temperature. Less than stoichiometric amounts of halogen can be used to control the amount of halogen as well as the amount of unreacted allyl groups in the product. It is frequently desireable to maintain the reaction mixture for a period of at least about one-half hour after halogen addition is complete. It may be of advantage to add an oxirane compound, such as an epoxide or polyepoxide, as a hydrohalide scavenger to aid in stabilization of the product. Removal of the solvent, for example, using distillation under reduced pressure, provides the final product.

In those instances where X is a halogen or an alkyl group, such products can be prepared by halogenating or alkylating the aromatic ring of the poly(alkenylphenol) prior to use in an allylation reaction.

Useful products are prepared wherein all or a part of the allyl groups are halogenated, and wherein all, a part, or none of the aromatic rings simultaneously bear halogen groups. Said products are useful as reactive additives for fine retardant polymers. If all of the allyl groups are completely halogenated, these halogenated products become useful as a non-reactive (no polymerizable allyl groups) additive for fire retardant polymers.

The poly(alkenylphenols) which are the starting materials for the products of the present invention can be purchased commercially from Maruzen Oil Co., Ltd., Tokyo, Japan as p-vinylphenol polymer Resin M or Resin MB.

If desired, the starting materials can be prepared by polymerizing an alkenylphenol or mixture of alkenylphenols by any suitable means such as heating in the presence or absence of a catalyst at a temperature of from about 25° C. to about 150° C. p-Vinylphenol readily homopolymerizes on standing at room temperature (25° C.).

The norbornyl (dicyclopentadiene) modified unsaturated polyesteramides used herein can be prepared by the methods described herein and they are further described in patent application Ser. No. 333,221, filed Dec. 21, 1981.

The norbornyl modified unsaturated polyesters used herein can be prepared by the methods described in U.S. Pat. Nos. 4,189,548 or 4,167,542 and 4,148,765.

The unsaturated polyester resins suitable for use herein are well known and are described in Kirk-Othmer Encyclopedia of Chemical Technology, 3rd edition, pp. 575–594 which is incorporated herein by reference.

The unsaturated polyesteramide resins suitable for use herein are prepared by substitution of a portion of the polyol with a suitable polyamine or mixture of polyamines.

The polyols used in either polyesters or polyesteramides are from the class of those having the formula: HO—R—OH where R is a divalent organic radical selected from the group consisting of alkylene, ether-linked alkylene, ether-linked arylene, cycloalkylene, polycycloalkylene, bis(alkyl)cycloalkylene, bis(alkyl)polycycloalkylene, and arylene. Mixtures of two or more of such polyols can also be used.

The polyamines used to make polyesteramides are from the class of those having the formula:

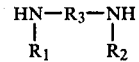

wherein $R_1$ and $R_2$ are independently selected from the group consisting of hydrogen, aliphatic, cycloaliphatic and aromatic radicals, or $R_1$ and $R_2$ taken together with the remainder of the molecule form an aliphatic ring; and $R_3$ is a divalent organic radical selected from the group consisting of alkylene, ether-linked alkylene, ether-linked arylene, alkylene amino-linked alkylene, alkylene amino-linked cycloalkylene, cycloalkylene, polycycloalkylene, arylene, alkylarylene, bis(alkyl)cycloalkylene and bis(alkyl)polycycloalkylene. Mixtures of two or more of such polyamines can also be used.

Typical diamines that are useful are ethylene diamine, propylene diamine, hexane-1,6-diamine, piperazine, 4,4'-methylenebis(cyclohexylamine), 2,2'-bis(4-aminocyclohexyl)propane, 4,4'-diaminodiphenyl ether, bis(aminomethyl)norbornane, toluene diamine, bis- (aminomethyl)dicyclopentadiene and homopiperazine. Typical polyamines are aminoethylpiperazine and diethylenetriamine.

Representatives of the useful diols are: ethylene glycol, propylene glycol, diethylene glycol, dipropylene glycol, dicyclopentadiene dimethanol, bis(hydroxymethyl)norbornane, methyl cyclohexanedimethanol, bis(hydroxypropyl)bisphenol A and other hydroxyalkylated bisphenols. Typical polyols are pentaerythritol and glycerine propoxylates.

The $\alpha,\beta$-unsaturated polycarboxylic acid is preferably maleic acid, fumaric acid, the anhydride of maleic acid or mixtures of these compounds. Such acids are readily available, have good reactivity with the diol and/or the diamine, and result in products of good properties. Other less preferred polycarboxylic acids include itaconic acid, citraconic acid, and the like.

Part of the $\alpha,\beta$-unsaturated polycarboxylic acid may be replaced with a saturated or aromatic polycarboxylic acid to vary the crosslinking potential and physical properties of the modified unsaturated polyester or polyesteramide. Such acids include the aliphatic acids such as adipic acid and the aromatic acids such as isophthalic acid. Replacement of part of the $\alpha,\beta$-unsaturated acid with such acids is commonplace in the polyester art. Suitable selection of the acid and the amount necessary to achieve a desired purpose will be known to the skilled worker and can be optimized with simple preliminary experiments.

The total amount of acid varies as a function of the total polyol or mixture of polyol and polyamine and norbornyl ingredients used.

The terminal group used to modify the polyester or polyesteramide is a norbornyl radical. Dicyclopentadiene (DCPD) is a most preferred norbornyl functional material to be employed in terminating one or both ends of the chain. Polycyclopentadiene (i.e., DCPD oligomers) or dicylopentadiene monoalcohol are also preferred species.

DCPD is sold commercially as a product of about 97 or greater percent purity. It is also sold as a $C_{10}$ hydrocarbon concentrate prepared by dimerizing a crude $C_5$ stream from the cracking of hydrocarbons as taught in U.S. Pat. No. 3,557,239.

Examples of some of the dimers which have been identified in these concentrates are the Diels-Alder adducts of two moles of isoprene (isoprene dimers), the adduct of cyclopentadiene and isoprene, the adduct of cyclopentadiene and piperylene and the like.

Either the $C_{10}$ concentrate or the relatively pure DCPD may be employed in preparing the modified polyesters or polyesteramides.

The modified unsaturated polyesters or polyesteramides can be prepared by a variety of techniques. In a preferred method, molten $\alpha,\beta$-unsaturated carboxylic anhydride is partially hydrolyzed with less than the stoichiometric equivalent of water and reacted with the norbornyl derivative to form an ester of that derivative and containing unesterified acid and anhydride. This reaction may conveniently be performed in stages whereby a reactant is added stepwise to control reaction exotherms. The product mixture is then reacted with the diol and/or diamine to result in the desired modified unsaturated polyesters or polyesteramides.

In a typical procedure, molten maleic anhydride and a fraction of the stoichiometric equivalent of water is maintained at an elevated temperature of from about 60° to 130° C. The initial fractional equivalent of dicyclopentadiene (DCPD) is then added and allowed to react. A second fractional equivalent of water and of DCPD is added and allowed to react. Additional fractional equivalents of DCPD are added and each allowed to react before addition of the next increment until the desired amount of DCPD has been added. The number of fractional equivalents can be increased and the size of each fractional equivalent correspondingly decreased to any desired number of fractional equivalents, including continuous addition. The relative size of the fractional equivalents can vary.

The amount of maleic (or other) anhydride employed in this first esterification step may be equal to the equivalent of DCPD in which event the product is essentially all ester. Alternatively, the amount of anhydride may be the equivalent needed to make the ester plus that excess that is to be used in the subsequent esterification or esteramidation step.

To the mixture of esterified DCPD and acid and/or anhydride is added the polyol and polyamine or the polyol alone. After addition of the polyol and polyamine or the polyol alone is complete, the reaction can be driven to maximum yield by maintaining or increasing the temperature until the desired acid number has been reached. Typically, acid numbers of 15 to 35 are preferred, with acid numbers of 15 to 25 being most preferred; although acid numbers that are higher or lower may be tolerated, and, in some instances, may be desired.

In an equally preferred method, molten $\alpha,\beta$-unsaturated carboxylic anhydride is essentially totally hydrolyzed with a stoichiometric or greater equivalent of water and reacted with the norbornyl derivative to form an ester of that derivative and containing unesterified acid. This reaction may conveniently be performed in stages whereby a reactant is added stepwise, controlling reaction exotherms. The product mixture is then reacted with the polyol and polyamine or the polyol alone to result in the desired modified unsaturated polyester or polyesteramide.

In a typical procedure, molten maleic anhydride and the stoichiometric or greater equivalent of water are maintained at an elevated temperature from about 50° to 150° C. The temperature is allowed to stabilize at about 120° to 125° C. and the initial fractional equivalent of DCPD is then added and allowed to react. A second fractional equivalent of DCPD is added and allowed to react. Additional fractional equivalents of DCPD are added and each allowed to react before addition of the next increment until the desired amount of DCPD has been added.

The amount of maleic (or other) anhydride employed in this first esterification step may be equal to the equivalent of DCPD in which event the product is essentially all ester. Alternatively, the amount of anhydride may be the equivalent needed to make the ester plus that excess that is to be used in the subsequent esterification or esteramidation step.

The polyol and polyamine or the polyol alone are added to the mixture of esterified DCPD and acid as previously described.

Many other alternate methods will be recognized by the skilled worker. For example, molten maleic anhydride may be added to a mixture of DCPD and water in a reactor. The polyol and polyamine or the polyol alone are added to the mixture of esterified DCPD and acid and/or anhydride as before. Finally, although less preferred, DCPD, maleic anhydride, water and glycol may be simultaneously reacted in a fashion similar to U.S. Pat. No. 4,148,765.

The vinyl ester resins (VER) useful herein are a well known class of resins made from unsaturated carboxylic acids and polyepoxides. Vinyl ester resins are the reaction product of about equivalent amounts of a monounsaturated monocarboxylic acid and a polyepoxide. One class of VER is described in U.S. Pat. No. 3,367,992 where dicarboxylic acid half esters of hydroxyalkyl acrylates or methacrylates are reacted with polyepoxide resins. Bowen in U.S. Pat. Nos. 3,066,122 and 3,179,623 describes the preparation of VER from monocarboxylic acids such as acrylic and methacrylic acid. Bowen also describes alternate methods of preparation wherein a glycidyl methacrylate or acrylate is reacted with the sodium salt of a dihydric phenol such as bisphenol A. VER based on epoxy novolac resins are described in U.S. Pat. No. 3,301,743 to Fekete, et al. Fekete, et al describe VER where the molecular weight of the polyepoxide is increased by reacting a dicarboxylic acid with the polyepoxide resin as well as acrylic acid, etc. in U.S. Pat. No. 3,256,226. Other difunctional compounds containing a group which is reactive with an epoxide group, such as an amine, mercaptan, and the like, may be utilized in place of the dicarboxylic acid. All of the above-described resins, which contain the characteristic linkage

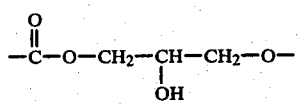

and terminal polymerizable vinylidene groups are classified as VER and are incorporated by reference.

Briefly, any of the known polyepoxides may be employed in the preparation of the vinyl ester resins. Useful polyepoxides are glycidyl polyethers of both polyhydric alcohols and polyhydric phenols, such as the diglycidyl ether of bisphenol A, epoxy novolacs, epoxidized fatty acids or drying oil acids, epoxidized diolefins, epoxidized di-unsaturated acid esters as well as epoxidized unsaturated polyester, so long as they contain more than one oxirane group per molecule. The polyepoxides may be monomeric or polymeric.

Preferred polyepoxides are glycidyl polyethers of polyhydric alcohols or phenols having weights per epoxide group of about 150 to 2000. The polyepoxides may be nuclearly substituted with halogen, preferably bromine. These polyepoxides are usually made by reacting at least about two moles of an epihalohydrin or glycerol dihalohydrin with one mole of the polyhydric alcohol or polyhydric phenol and a sufficient amount of a caustic alkali to combine with the halogen of the halohydrin. The products are characterized by the presence of more than one epoxide group per molecule, i.e., a 1,2-epoxy equivalency greater than one.

Vinyl ester resins are commercially available from The Dow Chemical Company under the trademark DERAKANE.

Any polymerizable ethylenically unsaturated monomer can be used herein. Such monomers include both monovinyl and polyvinyl monomers. Typical monomers include the alkenyl aromatic monomers such as styrene, α-methylstyrene, chlorostyrene, divinylbenzene, vinyltoluene, t-butylstyrene, and the like; and alkyl and hydroxyalkyl esters of acrylic and methacrylic acid such as the methyl, ethyl, propyl, butyl, cyclohexyl, and hydroxyethyl esters. In addition to the above, other monomers that are especially useful for ultraviolet light curable systems such as 2-acetoxyalkyl acrylates, pentaerythritol di-, tri-, or tetra-acrylate may be used.

Suitable curing agents which can be employed to cure the compositions of the present invention include, for example, free radical forming catalysts. Examples of these catalysts are benzoyl peroxide, tertiary butyl peroxide, methylethyl ketone peroxide, and the like. It is frequently of value to add accelerators such as cobalt naphthenate, dimethylaniline, and the like.

The compositions of the present invention are useful in the preparation of castings, laminates, coatings and the like.

The following examples are illustrative of the invention but are not to be construed as to limiting the scope thereof in any manner.

EXAMPLE 1

A. Preparation of poly(allylether) of poly(p-vinylphenol)

A transcarbonation reaction was used to prepare the poly(allylether) of poly(para-vinylphenol), as follows:

Allyl alcohol (128.6 grams, 2.22 moles), dimethyl carbonate (199.6 grams, 2.22 moles), and sodium methoxide catalyst (0.30 gram) were added to a reactor and maintained at room temperature (25° C.) with stirring under a nitrogen atmosphere. An equilibrium mixture of allylmethyl carbonate, diallyl carbonate, and methanol was rapidly formed. After thirty minutes (1800 s), poly(-para-vinylphenol) (26.77 grams, 0.00765 mole), triphenylphosphine (0.06 gram), and 5.0% palladium on carbon (0.24 gram) were added to the reactor and heating was started. The poly(para-vinylphenol) used was a commercial grade product with a 3500 average molecular weight. The reaction mixture was maintained for four hours at 82° C. and then cooled to 40° C. Filtration through Celite, followed by vacuum stripping at 100° C. and 10 mm Hg (1.33 kPa) provided a light ambercolored, tacky solid (34.2 grams 95.2% yield). Nuclear magnetic resonance spectroscopy confirmed the product as the poly(allylether) of poly(para-vinylphenol), wherein 100% of the phenolic hydroxyl groups were converted to allylether groups.

B. Preparation of dicyclopentadiene modified unsaturated polyesteramide

A dicyclopentadiene modified unsaturated polyesteramide resin was prepared for formulation with styrene and the poly(allylether) of poly(para-vinylphenol):

Maleic anhydride (686.42 grams, 7.00 moles) was added to a reactor and heated to a clear, stirred solution maintained at 100° C. under a nitrogen atmosphere. Water (127.94 grams, 7.10 moles) was added, inducing a maximum exotherm of 135° C. one minute (60 s) later. The reactor was air-cooled to 121° C. and fifteen minutes (900 s) after the initial water addition dicyclopentadiene (277.64 grams, 2.10 moles) was added. The dicyclopentadiene was of about 97% purity. A maximum exotherm of 125° C. resulted two minutes (120 s) later and after an additional three minutes (180 s), air cooling reduced the reaction temperature to 120° C. Fifteen minutes (900 s) after the initial dicyclopentadiene addition, a second aliquot of dicyclopentadiene (277.64 grams, 2.10 moles) was added. A maximum exotherm of 124° C. resulted five minutes (300 s) later and after an additional five minutes (300 s), air cooling reduced the reaction temperature to 120° C. A final aliquot of dicyclopentadiene (277.64 grams, 2.10 moles) was added fifteen minutes (900 s) after the second dicyclopentadiene addition and the 120° C. reaction temperature was re-achieved three minutes (180 s) later. Thirty minutes (1800 s) later, propylene glycol (287.66 grams, 3.78 moles) and piperazine (36.18 grams, 0.420 moles) were added and nitrogen sparging was increased to four liters per minute (66.7 ml/s), the steam condenser was started, and the temperature controller was set at 160° C. This temperature was achieved thirty-two minutes (1920 s) later. After two hours (7200 s), the temperature controller was set at 205° C. and this temperature was achieved twenty-five minutes (1500 s) later. After fourteen hours (50,400 s), 151.5 milliliters of water layer and 32 milliliters of organic material were recovered into the Dean Stark trap. The reactor was cooled to 168° C. and 100 ppm of hydroquinone was added. The modified polyesteramide resin was recovered as a clear, light yellow colored solid with a final acid number of 18.8.

C. Preparation and curing of thermosettable resin composition

A portion of the modified polyesteramide (199.5 grams), styrene (133.0 grams), and the poly(allylether) of poly(para-vinylphenol) (17.5 grams) were formulated to provide a 57.0, 38.0, 0.5% solution, respectively. This solution was used to determine the Brookfield viscosity (25° C.), SPI (84° C.) gel and cure times plus maximum exotherm, and a clear, unfilled casting was prepared for use in mechanical property evaluations. A cure system of 1.0% benzoyl peroxide and 0.01% N,N-dimethylaniline was used at room temperature (25° C.), followed by post-curing for two hours (7200 s) at 200° F. (93° C.). Tensile test pieces (eight) and flexural test pieces (six) were prepared from the clear, unfilled casting and tested using an Instron machine with standard methods (ASTM D-638 and D-790). A pair of heat distortion temperature test pieces were prepared from the clear, unfilled casting and testing using an Aminco plastic deflection tester (American Instrument Co.) with standard methods (ASTM D-648). All Barcol hardness values are on the 934-1 scale. The results are reported in Table I.

COMPARATIVE EXPERIMENT A

A portion of the modified polyesteramide (199.5 grams) from Example 1 and styrene (150.5 grams) were formulated to provide a 57.0, 43.0% solution, respectively. The physical and mechanical properties were evaluated using the method of Example 1. The results are reported in Table I.

TABLE I

|  | Example 1 | Comparative Experiment A |
|---|---|---|
| Brookfield Viscosity (cp) | 622 | 325 |
| SPI Gel |  |  |
| Gel time, min (sec) | 3.7 (222) | 2.6 (156) |
| Cure time, min (sec) | 5.4 (324) | 4.2 (252) |
| Maximum exotherm (°C.) | 187 | 228 |
| Average Barcol Hardness | 45 | 45 |
| Heat Distortion Temperature, (°F./°C.) | 234/112.2 | 239/115 |
| Tensile Strength, psi (MPa) | 5,500 (37.9) | 5,400 (37.2) |
| Elongation (%) | 1.4 | 1.3 |
| Flexural Strength, psi (MPa) | 16,400 (113) | 12,400 (85.4) |
| Flexural Modulus, | 560,000 | 600,000 |

TABLE I-continued

|  | Example 1 | Comparative Experiment A |
|---|---|---|
| psi (MPa) | (3858.4) | (4134) |

EXAMPLE 2

A. Preparation of poly(allylether) of brominated poly(p-vinylphenol)

A transcarbonation reaction was used to prepare the poly(allylether) of brominated poly(para-vinylphenol), as follows:

Allyl alcohol (144.2 grams, 2.48 moles), dimethyl carbonate (223.6 grams, 2.48 moles), and sodium methoxide catalyst (0.33 gram) were added to a reactor and maintained at room temperature (25° C.) with stirring under a nitrogen atmosphere. An equilibrium mixture of allylmethyl carbonate, diallyl carbonate, and methanol was rapidly formed. After thirty minutes (1800 s), brominated poly(para-vinylphenol) (50.0 grams, 0.0050 mole), triphenylphosphine (0.06 gram), and 5.0% palladium on carbon (0.25 gram) were added to the reactor and heating was started. The brominated poly(para-vinylphenol) used was a commercial grade product with a 10,000 average molecular weight and containing an average of 1.03 bromine atoms per para-vinylphenol unit. The reaction mixture was maintained for six hours (21,600 s) at 82° C and then cooled to 25° C. Filtration through Celite, followed by vacuum stripping at 100° C. and 10 mm Hg (1.33 kPa) provided a light tan-colored solid (58.5 grams, 99.2% yield). Nuclear magnetic resonance spectroscopy confirmed the product as the poly(allylether) of brominated poly(para-vinylphenol), wherein 88% of the phenolic hydroxyl groups were converted to allylether groups.

B. Preparation and curing of thermosettable resin composition

Commercial grade DERAKANE 411 vinyl ester (220.0 grams), styrene (140.65 grams), and a portion of the poly(allylether) of brominated poly(para-vinylphenol) (20.0 grams) were formulated to provide a 57.80, 36.95, 5.25% solution, respectively. This solution was used to determine the Brookfield viscosity (25° C.), SPI (84° C.) gel and cure times plus maximum exotherm, and a clear, unfilled casting was prepared for use in mechanical property evaluations, using the method of Example 1. The results are reported in Table II.

COMPARATIVE EXPERIMENT B

Commercial grade DERAKANE 411-45 vinyl ester resin (containing 55.0% DERAKANE 411 vinyl ester and 45.0% styrene) was evaluated for physical and mechanical properties using the method of Example 1. The results are reported in Table II.

TABLE II

|  | Example 2 | Comparative Experiment B |
|---|---|---|
| Brookfield Viscosity (cp) | 2400 | 552 |
| SPI Gel |  |  |
| Gel time, min (sec) | 8.0 (480) | 8.3 (498) |
| Cure time, min (sec) | 11.4 (684) | 10.7 (642) |
| Maximum exotherm (°C.) | 177 | 192 |
| Average Barcol Hardness | 40 | 29 |
| Heat Distortion Temperature, (°F./°C.) | 210/98.9 | 198/92.2 |
| Tensile Strength, psi (MPa) | 11,000 (75.8) | 10,600 (73) |

TABLE II-continued

|  | Example 2 | Comparative Experiment B |
|---|---|---|
| Elongation (%) | 3.2 | 3.4 |
| Flexural Strength, psi (MPa) | 21,500 (148.1) | 21,300 (146.8) |
| Flexural Modulus, psi (MPa) | 570,000 (3927.3) | 550,000 (3789.5) |

EXAMPLE 3

A. Preparation of unsaturated polyester

An orthophthalate unsaturated polyester resin was prepared for formulation with styrene and a portion of the brominated poly(allylether) of poly(para-vinylphenol) from Example 2:

Maleic anhydride (264.76 grams, 2.76 moles) and phthalic anhydride (266.62 grams, 1.80 moles) were added to a reactor and heated to a white, stirred slurry maintained at 100° C. under a nitrogen atmosphere. Propylene glycol (376.70 grams, 4.95 moles) was added and a maximum exotherm of 137° C. occurred twenty-three minutes (1380 s) later. At this time, nitrogen sparging was increased to 0.5 liter per minute (8.3 ml/sec), the steam condenser was started, and the temperature controller was set at 160° C. This temperature was achieved ten minutes (600 s) later. After one hour (3600 s), the temperature controller was set at 205° C. and this temperature was achieved twenty minutes (1200 s) later. After seven hours (25,200 s), 80.5 milliliters of water layer was recovered into the Dean Stark trap. The reactor was cooled to 160° C. and 100 ppm of hydroquinone was added. The unsaturated polyester resin was recovered as a transparent solid with a final acid number of 31.4.

B. Preparation and curing of thermosettable resin composition

A portion of the orthophthalate unsaturated polyester (199.5 grams), styrene (133.0 grams), and the brominated poly(allylether) of poly(para-vinylphenol) from Example 2 (17.5 grams) were formulated to provide a 57.0, 38.0, 5.0% solution, respectively. This solution was used to determine the Brookfield viscosity (25° C.), SPI (84° C.) gel and cure times plus maximum exotherm, and a clear, unfilled casting was prepared for use in mechanical property evaluations, using the method of Example 1. The results are reported in Table III.

COMPARATIVE EXPERIMENT C

A portion of the orthophthalate unsaturated polyester (199.5 grams) for Example 3 and styrene (150.5 grams) were formulated to provide a 57.0, 43.0% solution, respectively. The physical and mechanical properties were evaluated using the method of Example 1. The results are reported in Table III.

TABLE III

|  | Example 3 | Comparative Experiment C |
|---|---|---|
| Brookfield Viscosity (cp) | 297 | 112 |
| SPI Gel |  |  |
| Gel time, min (sec) | 3.0 (180) | 2.4 (144) |
| Cure time, min (sec) | 4.9 (294) | 3.9 (234) |
| Maximum exotherm (°C.) | 196 | 223 |
| Average Barcol Hardness | 46 | 47 |
| Heat Distortion Temperature, | 191/88.3 | 199/92.8 |
| Tensile Strength, psi (MPa) | 9,600 (66.1) | 7,100 (48.9) |
| Elongation (%) | 1.9 | 1.5 |
| Flexural Strength, psi (MPa) | 18,100 (124.7) | 18,400 (126.8) |
| Flexural Modulus, psi (MPa) | 610,000 (4202.9) | 600,000 (4134) |

EXAMPLE 4

A series of 5.0 by 0.5 by 0.125 inch heat distortion temperature test pieces were prepared from the clear, unfilled castings of both Example 1 and Comparative Experiment A. The test pieces were placed on a flat aluminum tray which was then suspended in a forced-air convection-type oven. Further curing at 94° C. for three hours (10800 s), 125° C. for 1.5 hours (90 s), and 150° C. for 5.5 hours (19800 s) was completed, followed by heat aging for the indicated times and at a 200° C. temperature, as summarized in Table IV. Test pieces were removed at the indicated exposure intervals and the heat distortion temperatures were determined using the method of Example 1. The results are reported in Table IV.

TABLE IV

| Total Time of Thermal Exposure | Heat Distortion Temperature, (°F./°C.) | |
|---|---|---|
| (Hours/Seconds) | Example 1 | Comparative Experiment A |
| 12/43200 | 325/162.8 | 330/165.6 |
| 36/129600 | 328/164.4 | 326/163.3 |
| 60/216000 | 329/165 | 324/162.2 |

EXAMPLE 5

A 5.0 by 0.5 by 0.125 inch test piece was prepared from the clear, unfilled castings of both Example 3 and Comparative Experiment C. The test pieces were weighed and placed on a flat aluminum tray which was then suspended in a forced-air, convection-type oven. Further curing at 94° C. for three hours (10800 s) was completed, followed by heat aging for the indicated times and temperatures, as summarized in Table V. Test pieces were removed at the indicated exposure intervals, weighed, examined, and then replaced into the oven. The weight data was used to calculate the percent weight loss as reported in Table V.

TABLE V

| Total Time of Thermal Exposure (Hours/seconds) | Exposure Temperature (°C.) | Percent Weight Loss | | Visual Observations | |
|---|---|---|---|---|---|
| | | Example 3 | Comparative Experiment C | Example 3 | Comparative Experiment C |
| 2.3/8280 | 125 | −0.34 | −0.35 | unchang. | unchang. |
| 18.3/65880 | 125 | −0.54 | −0.58 | unchang. | unchang. |
| 24.5/88200 | 150 | −0.65 | −0.71 | unchang. | surface hairline crazing |
| 44.0/158400 | 150 | −0.90 | −0.99 | unchang. | hairline crazing progresses |

TABLE V-continued

| Total Time of Thermal Exposure (Hours/seconds) | Exposure Temperature (°C.) | Percent Weight Loss Example 3 | Percent Weight Loss Comparative Experiment C | Visual Observations Example 3 | Visual Observations Comparative Experiment C |
|---|---|---|---|---|---|
| 67.0/241200 | 150 | −1.06 | −1.16 | unchang. | crazing penetrates surface |
| 93.0/334800 | 150 | −1.19 | −1.30 | unchang. | crazing & hairline cracking |
| 187.5/675000 | 150 | −1.46 | −1.64 | unchang. | severe crazing with hairline cracking |

EXAMPLE 6

A series of 5.0 by 0.5 by 0.125 inch heat distortion temperature test pieces were prepared from the clear, unfilled castings of both Example 3 and Comparative Experiment C. The test pieces were placed on a flat aluminum tray which was then suspended in a forced-air, convection-type oven. Further curing at 94° C. for three hours (10800 s) was completed, followed by heat aging at the indicated times and temperatures, as summarized in Table VI. Test pieces were removed at the indicated exposure intervals and the heat distortion temperature determined using the method of Example 1. The results are reported in Table VI.

TABLE VI

| Total Time of Thermal Exposure (Hrs/sec) | Exposure Temperature (°C.) | Heat Distortion Temperature, (°F./°C.) Example 3 | Heat Distortion Temperature, (°F./°C.) Comparative Experiment C |
|---|---|---|---|
| 24.5/88,200 | 150 | 222/105.6 | 204.95.6 |
| 67.0/241,200 | 150 | 212/100 | 206.96.7 |
| 187.5/675,000 | 150 | 216/102.2 | 203/95 |

EXAMPLE 7

A portion of the modified polyesteramide (36.0 grams) from Example 1, styrene (30.0 grams) and a portion of the poly(allylether) of brominated poly(para-vinylphenol) (9.0 grams) from Example 2 were formulated to provide a 48.0, 40.0, 12.0% solution, respectively. This solution was used to prepare a clear, unfilled casting for use in oxygen index testing. A cure system of 2.0% benzoyl peroxide and 0.01% N,N-dimethylaniline was used at room temperature (25° C.), followed by post-curing for two hours (7200 s) at 200° F. (94° C.). Oxygen index test pieces were prepared from the clear, unfilled casting and tested using standard methods (ASTM D-2863-76). The results are reported in Table VII.

COMPARATIVE EXPERIMENT D

A portion of the modified polyesteramide (42.75 grams) from Example 1 and styrene (32.25 grams) were formulated to provide a 57.0, 43.0% solution, respectively. The oxygen index was determined using the method of Example 7. The results are reported in Table VII.

TABLE VII

|  | Oxygen Index Value |
|---|---|
| Example 7 | 21.5 |
| Comparative Experiment D | less than 21.0 |

The bromine-containing composition of Example 7 burned with reduced smoke and thick ash formation at values below the oxygen index value. The non-bromine-containing composition of Comparative Experiment D burned with black smoke without leaving a residue.

I claim:

1. A composition which is thermosettable upon curing with a curing quantity of a suitable curing agent, which thermosettable composition comprises,
   (1) from 5 to about 95 percent by weight (pbw) of at least one resin composition selected from the group consisting of
       (a) unsaturated polyester resins,
       (b) unsaturated polyesteramide resins,
       (c) dicyclopentadiene modified unsaturated polyester resins,
       (d) dicyclopentadiene modified unsaturated polyesteramide resins, and
       (e) vinyl ester resins,
   (2) from zero to about 95 pbw of at least one polymerizable ethylenically unsaturated monomer; and
   (3) from about 1 to about 50 pbw of a composition represented by any of formulas I through VIII in the specification;

wherein each A is a group represented by the formula $-CH_2-CH=CH_2$ (allyl); each R, R' and R" is independently hydrogen or an alkyl group having from 1 to about 3 carbon atoms; each X is independently an alkyl group having from 1 to about 4 carbon atoms, chlorine or bromine with the proviso that at least one X on each ring is chlorine or bromine; each X' is independently chlorine or bromine; Q is independently a group derived from any suitable polymerization initiator or terminator, $-H$,

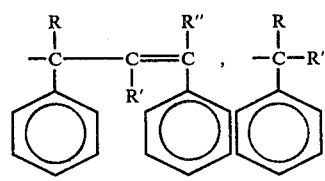

and wherein each aromatic ring may contain any substituent group as those enumerated as substituent groups in Formulas I through VIII; n has a value from about 5 to about 100, preferably from about 15 to about 80; n' has a value of from about 1 to about 99, preferably from about 1 to about 30; n" has a value of from about 1 to about 99, preferably from about 30 to about 99; x has a value from zero to 4; x' has a value of from zero to 3; x" has a value of zero to 2; y has a value of 1 or 2; z has a value from 0 to about 100; z' has a value of from 0 to about 100 and z" has a value from about 1 to about 100 and wherein the pbw of the individual components is based upon total composition.

2. A composition of claim 1 wherein
   (a) component (1) is present in quantities of from about 20 to about 80 pbw;
   (b) component (2) is present in quantities of from about 70 to about 20 pbw; and
   (c) component (3) is present in quantities of from about 1 to about 30 pbw.

3. A composition of claim 2 wherein
   (a) component (1) is present in quantities of from about 45 to about 70 pbw;
   (b) component (2) is present in quantities of from about 30 to about 55 pbw; and
   (c) component (3) is present in quantities of from about 3 to about 15 pbw.

4. A composition of claims 1, 2 or 3 wherein
   (a) component (1) contains at least one of components (1-a), (1-c), (1-d) or (1-e);
   (b) component (2) contains styrene; and
   (c) component (3) contains at least one composition represented by formulas I, II, III, IV, VII or VIII.

5. A composition of claim 4 wherein component (3) contains a composition represented by Formula I wherein each R, R' and R" is independently hydrogen or a methyl group and x has a value of zero.

6. A composition of claim 4 wherein component (3) contains a composition represented by Formula I wherein each R, R' and R" is independently hydrogen or a methyl group; X is bromine and x has a value from 1 to 2.

7. A composition of claim 4 wherein component (3) contains a composition represented by Formula II wherein each R, R' and R" is independently hydrogen or a methyl group and x has a value of zero.

8. A composition of claim 4 wherein component (3) contains a composition represented by Formula II wherein each R, R' and R" is independently hydrogen or a methyl group; X is bromine and x has a value of from 1 to 2.

9. A composition of claim 4 wherein component (3) contains a composition represented by Formula III wherein each R, R' and R" is independently hydrogen or a methyl group and x' has a value of zero.

10. A composition of claim 4 wherein component (3) contains a composition represented by Formula III wherein each R, R' and R" is independently hydrogen or a methyl group; X is bromine and x' has a value of from 1 to 2.

11. A composition of claim 4 wherein component (3) contains a composition represented by Formula IV wherein each R, R' and R" is independently hydrogen or a methyl group; x has a value of zero and x' has a value of zero.

12. A composition of claim 4 wherein component (3) contains a composition represented by Formula IV wherein each R, R' and R" is independently hydrogen or a methyl group; X is bromine; x has a value from 1 to 2 and x' has a value from 1 to 2.

13. A composition of claim 4 wherein component (3) contains a composition represented by Formula VII wherein each A is a group represented by the formula —CH$_2$—CH=CH$_2$(allyl); each R, R' and R" is independently hydrogen or an alkyl group having from 1 to about 3 carbon atoms; each X is independently an alkyl group having from 1 to about 4 carbon atoms, chlorine or bromine; each X' is independently chlorine or bromine; x has a value of from zero to 4; z' has a value of from zero to about 100 and z" has a value of from about 1 to about 100.

14. A composition of claim 13 wherein each R, R' and R" is independently hydrogen or a methyl group and x has a value of zero.

15. A composition of claim 13 wherein each R, R' and R" is independently hydrogen or a methyl group; x has a value of zero and z has a value of zero.

16. A composition of claim 13 wherein each R, R' and R" is independently hydrogen or a methyl group; x has a value of zero and z' has a value of zero.

17. A composition of claim 13 wherein each R, R' and R" is independently hydrogen or a methyl group; x has a value of zero; z has a value of zero and z' has a value of zero.

18. A composition of matter of claim 13 wherein each R, R' and R" is independently hydrogen or a methyl group; X is bromine; X' is bromine; x has a value of from 1 to 2 and z has a value of zero.

19. A composition of claim 13 wherein each R, R' and R" is independently hydrogen or a methyl group; X is bromine; X' is bromine; x has a value from 1 to 2 and z' has a value of zero.

20. A composition of matter of claim 13 wherein each R, R' and R" is independently hydrogen or a methyl group; X is bromine; X' is bromine; x has a value from 1 to 2; z has a value of zero and z' has a value of zero.

21. A composition of claim 4 wherein component (3) is a composition represented by Formula VIII wherein each A is a group represented by the formula —CH$_2$—CH=CH$_2$; each R, R' and R" is independently hydrogen or an alkyl group having from 1 to about 3 carbon atoms; each X is independently an alkyl group having from 1 to about 4 carbon atoms, chlorine or bromine; x has a value from zero to 3; y has a value of 1 or 2; z has a value from zero to about 100; z' has a value from about 0 to about 100 and z" has a value from about 1 to about 100.

22. A composition of claim 21 wherein each R, R' and R" is independently hydrogen or a methyl group; x has a value of zero and x' has a value of zero.

23. A composition of claim 21 wherein each R, R' and R" is independently hydrogen or a methyl group; x has a value of zero and z has a value of zero.

24. A composition of claim 21 wherein each R, R' and R" is independently hydrogen or a methyl group; x has a value of zero; x' has a value of zero and z' has a value of zero.

25. A composition of claim 21 wherein each R, R' and R" is independently hydrogen or a methyl group; x has a value of zero; z has a value of zero and z' has a value of zero.

26. A composition of claim 21 wherein each R, R' and R" is independently hydrogen or a methyl group; X is bromine; X' is bromine; x has a value from 1 to 2 and z has a value of zero.

27. A composition of claim 21 wherein each R, R' and R" is independently hydrogen or a methyl group; X is bromine; X' is bromine; x has a value of from 1 to 2, x' has a value of from 1 to 2 and z' has a value of zero.

28. A composition of claim 21 wherein each R, R' and R" is hydrogen or a methyl group; X is bromine; X' is bromine; x has a value from 1 to 2; z has a value of zero and z' has a value of zero.

29. A cured composition which results from subjecting a composition of claims 1, 2 or 3 containing a curing quantity of a suitable curing agent therefor to curing conditions.

30. A cured composition which results from subjecting a composition of claim 4 containing a curing quantity of a suitable curing agent therefor to curing conditions.

* * * * *